(12) United States Patent
Kamachi

(10) Patent No.: US 7,400,730 B2
(45) Date of Patent: Jul. 15, 2008

(54) CRYPTOGRAPHIC COMMUNICATION METHOD IN COMMUNICATION SYSTEM

(75) Inventor: Ken'ichiro Kamachi, Tokyo (JP)

(73) Assignee: NEC Corporation (JP)

( * ) Notice: Subject to any disclaimer, the term of this patent is extended or adjusted under 35 U.S.C. 154(b) by 728 days.

(21) Appl. No.: 10/833,307

(22) Filed: Apr. 28, 2004

(65) Prior Publication Data

US 2004/0247124 A1    Dec. 9, 2004

(30) Foreign Application Priority Data

May 19, 2003    (JP)    ............................. 2003-139782

(51) Int. Cl.
 *H04L 9/00* (2006.01)
 *H04L 9/08* (2006.01)
 *H04L 9/16* (2006.01)
(52) U.S. Cl. ..................... 380/259; 380/255; 380/277; 380/42; 380/37
(58) Field of Classification Search .................. None
See application file for complete search history.

(56) References Cited

U.S. PATENT DOCUMENTS 7,058,042 B2 * 6/2006 Bontempi et al. ........... 370/338

2004/0122956 A1 * 6/2004 Myers et al. ................ 709/228

FOREIGN PATENT DOCUMENTS

| EP | 1 049 287 A2 | | 11/2000 |
|---|---|---|---|
| EP | 1 085 778 A2 | | 3/2001 |
| JP | 01-120143 | | 5/1989 |
| JP | 06-164573 | | 6/1994 |
| JP | 06-237248 | | 8/1994 |
| JP | 10-145351 | | 5/1998 |
| JP | 11239125 A | * | 8/1999 |
| JP | 2001-189721 | | 7/2001 |
| WO | WO 99/26420 | | 5/1999 |
| WO | WO 03/007569 A1 | | 1/2003 |
| WO | WO 03/028027 A1 | | 4/2003 |

OTHER PUBLICATIONS

United Kingdom Search Report dated Sep. 29, 2004.
DoCoMo Techical Journal, vol. 9, No. 1, pp. 61-79.

* cited by examiner

*Primary Examiner*—Syed A. Zia
(74) *Attorney, Agent, or Firm*—Dickstein, Shapiro, LLP.

(57) ABSTRACT

An RNC server issues an encryption start instruction to a media gateway (MG) and a terminal. The MG and terminal, which have received the encryption start instruction, encrypt U-Plane information using a predetermined secret key, and adds a predetermined encryption start bit to the encrypted U-Plane information for transmission to a communication partner. The communication partner, upon detection of the encryption start information, decrypts the received U-Plane information using the predetermined secret key.

7 Claims, 6 Drawing Sheets

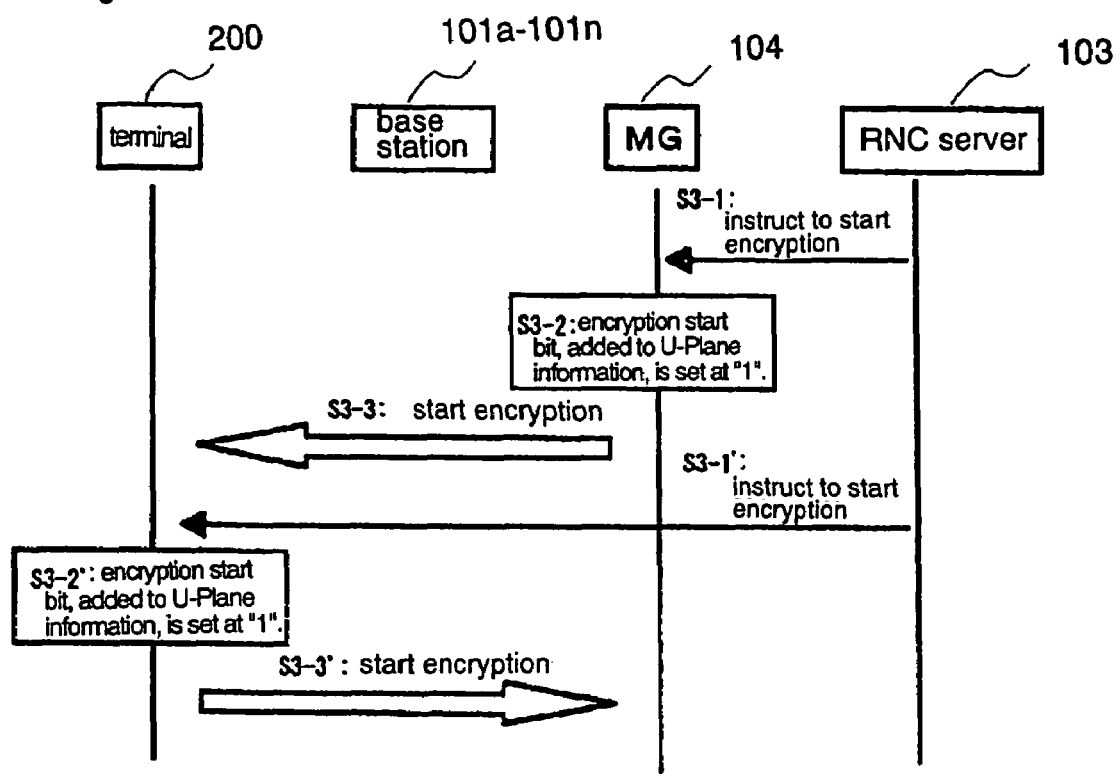

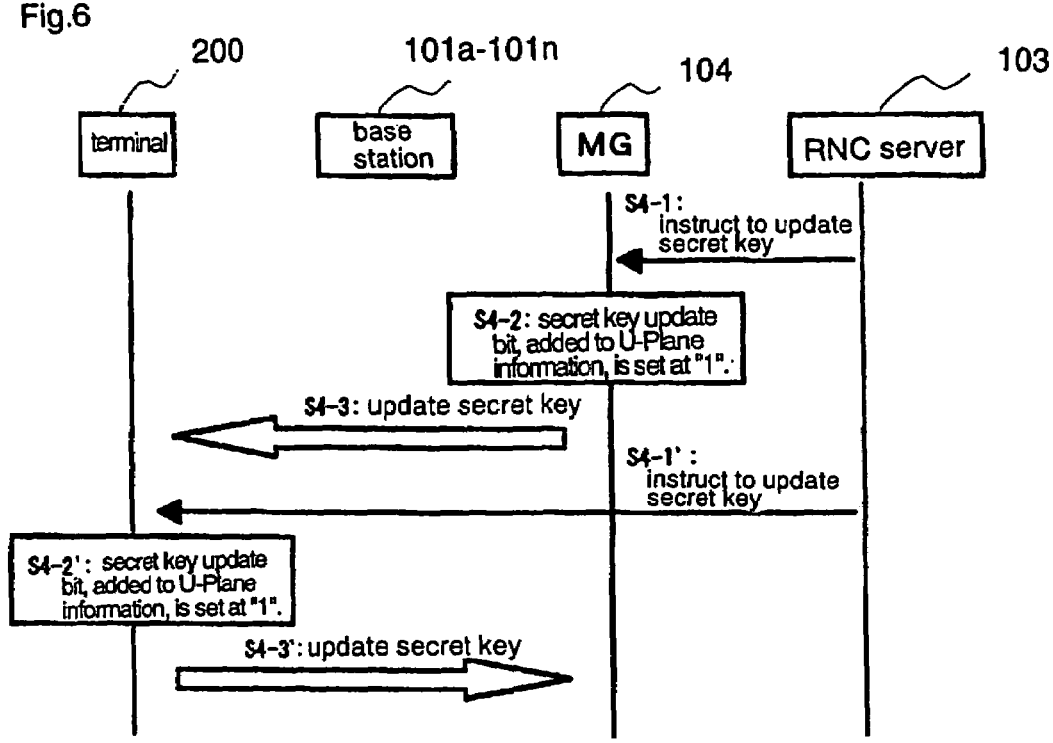

CRYPTOGRAPHIC COMMUNICATION METHOD IN COMMUNICATION SYSTEM

BACKGROUND OF THE INVENTION

1. Field of the Invention

The present invention relates to cryptographic communication technologies in communication networks such as a mobile communication network, and more particularly, to a cryptographic communication method in a communication network which has a control plane (hereinafter called the "C-Plane") separated from a user plane (U-Plane).

2. Description of the Related Art

First, a conventional cryptographic communication technology will be described in connection with an exemplary mobile communication system which employs an IMT-2000 logical system configuration.

FIG. 1 is a block diagram illustrating an exemplary configuration of a mobile communication system. Illustrated herein is a mobile communication system which includes radio access network (RAN) 100' and a plurality of terminals 200'. RAN 100' includes a plurality of base stations 101a', 101b', 101c', . . . capable of communicating with terminals 200', and radio network controller (RNC) 105 connected to these base stations through lines. RNC 105 is connected to core network 300 as required.

Radio access network 100' is in synchronization with terminals 200', and they have common frame numbers called "CFN" (Connection Frame Number). See, for example, DoCoMo Technical Journal Vol. 9, No. 1, pp. 61-79.

In such a system, RNC 105 specifies an encryption start timing using CFN upon encryption, so that a base station and a terminal, which have established the synchronization therebetween, start encryption at the same timing (same CFN).

FIG. 2 is a sequence diagram illustrating a conventional encryption procedure. Assume in this procedure that a secret key has been previously shared between RNC 105 and terminal 200'. As illustrated in FIG. 2, the conventional encryption starting procedure is performed in the following manner.

Step S1-1: RNC 105 indicates a "CFNs" (Connection Frame Number start) value indicative of an encryption start timing to terminal 200'. As described later, CFNs has a value larger than a current CFN.

Step S1-2: RNC 105 sets a terminal supporting function unit to start encryption of user signals if CFN matches CFNs.

Step S1-2': Terminal 200' also makes settings therein to start the encryption of the user signals if CFN matches CFNs.

Step S1-3: When CFN=CFNs after the lapse of certain time, the encryption is started by RNC 105 and terminal 200' in synchronization with each other.

Here, CFNs indicated at step S1-1 must be set to a larger value than CFN at the time of step S1-1. Specifically, the value of CFNs should be determined in consideration of a time margin for absorbing a transmission delay between RNC 105 and terminal 200', and processing delays within RNC 105 and terminal 200'.

A cryptographic communication method similar to the above is disclosed in JP-6-237248-A. This conventional method involves previously transmitting temporal positional information to a communication partner for starting encryption, and changing a cryptographic key at a specified temporal position at both parties after confirmation. In this way, even during communications, encryption processing can be changed without interrupting the communications (see JP-6-237248, Paragraphs 0012-0014 and FIG. 3).

Some mobile communication network has a communication device associated with the C-Plane responsible for signaling such as call setting and disconnection of a network, separated from a communication device associated with the U-Plane responsible for transmission and reception of user data (C/U separation).

In such a C/U separated network system, the aforementioned RNC 105 is divided into an RNC server 103 associated with the C-Plane, and a media gateway (MG) 104 associated with the U-Plane. Specifically, RAN 100' comprises a plurality of base stations, an RNC server, and an MG which are interconnected through an IP network, with the IP network being further connected to a core network.

FIG. 3 is a sequence diagram illustrating a conventional encryption starting procedure in a C/U separated mobile communication access network. Note herein, however, that a synchronization establishment procedure is omitted in FIG. 3. Assume that a secret key has been previously shared between the MG and terminal.

As illustrated in FIG. 3, the conventional encryption starting procedure is performed in the following manner.

Step S2-1: An RNC server indicates an encryption start timing CFNs to the MG. As later described, CFNs has a value larger than a current CFN.

Step S2-1': The RNC server indicates the encryption start timing CFNs to the terminal.

Step S2-2: The MG sets a terminal support function unit to start the encryption of user signals if the value of CFN is equal to CFNs.

Step S2-2': The terminal also makes settings therein to start the encryption of the user signals if the value of CFN is equal to CFNs.

Step S2-3: When CFN is equal to CFNs after the lapse of a certain time, the encryption is started by both the MG and terminal in synchronization.

CFNs indicated herein must be set to a larger value than CFN at the time of step S2-1, as is the case with the example illustrated in FIG. 2. However, in the C/U separated network system, CFNs must be set in consideration of a transmission delay between the RNC server and terminal, a transmission delay between the RNC server and MG, and a difference in delay in internal processing between the MG and terminal, in order to ensure that the MG and terminal, which are actually involved in the encryption, operate at the same timing.

However, in the C/U separated network system, a larger margin must be allowed for the encryption start timing CFNs, as compared with the system illustrated in FIG. 2, because the C/U separated network system must take into account a transmission delay on a network as well as a processing delay. Particularly, when the Internet is used as IP network 102, variations in transmission delay become larger, so that an even larger margin must be allowed for CFNs. As a result, a long standby time is required at all times before the MG and terminal actually start the encryption, resulting in an exacerbated response.

SUMMARY OF THE INVENTION

It is an object of the present invention to provide a cryptographic communication method which improves the response in a C/U separated network system.

According to the present invention, in a communication network having a plurality of terminal devices, a communication controller associated with a control plane (hereinafter called the "C-Plane"), and a data communication device associated with a user plane (hereinafter called the "U-plane"), in such a manner that the communication controller is separated from the data communication device, wherein at least one secret key is shared between an arbitrary terminal and the data communication unit. The communication controller transmits encryption control information to at least one of the data communication device and the terminal. One of the data communication device and the terminal, which has received the encryption control information, encrypts U-Plane information to be transmitted to the other party using one of the shared secret keys in accordance with the contents of the encryption control information, and adds the encryption control information to the encrypted U-Plane information for transmission to the other party. Then, the other party, upon receipt of the encrypted U-Plane information with the encryption control information added thereto, decrypts the encrypted U-Plane information using one of the shared secret keys.

According to a first aspect of the present invention, the communication controller transmits an encryption start instruction to at least one of the data communication device and terminal. One of the data communication device and terminal, which has received the encryption start instruction, encrypts U-Plane information to be transmitted to the other party using the secret key, and adds encryption start information to the encrypted U-Plane information for transmission to the other party. The other party, upon receipt of the encrypted U-Plane information with the encryption start information added thereto, decrypts the encrypted U-Plane information using the secret key.

According to a second aspect of the present invention, another secret key, different from a secret key currently in use, is shared between an arbitrary terminal device and the data communication device. The communication controller transmits a secret key update instruction to at least one of the data communication device and terminal. One of the data communication device and terminal, which has received the secret key update instruction, encrypts U-Plane information to be transmitted to the other party using the other secret key, and adds secret key update information to the encrypted U-Plane information for transmission to the other party. The other party, upon receipt of the encrypted U-Plane information with the secret key update information added thereto, decrypts the encrypted U-Plane information using the other secret key.

According to the present invention, with the addition of the encryption start information or secret key update information to the U-Plane information, there is no need for indicating the start of encryption and specifying an update timing to a terminal. Consequently, in a C/U separated network, even if a transmission delay time largely varies between a communication controller associated with the C-Plane and a data communication device associated with the U-Plane, the encryption can be started, and a secret key can be updated without providing a margin in preparation for the worst delay time. In addition, since the secret key can be updated only through a key update procedure during a communication, a communication response is improved.

BRIEF DESCRIPTION OF THE DRAWINGS

FIG. 5 is a sequence diagram illustrating a cryptographic communication method according to a first embodiment of the present invention; and FIG. 6 is a sequence diagram illustrating a cryptographic communication method according to a second embodiment of the present invention.

DETAILED DESCRIPTION OF THE PREFERRED EMBODIMENTS

Figure 1:
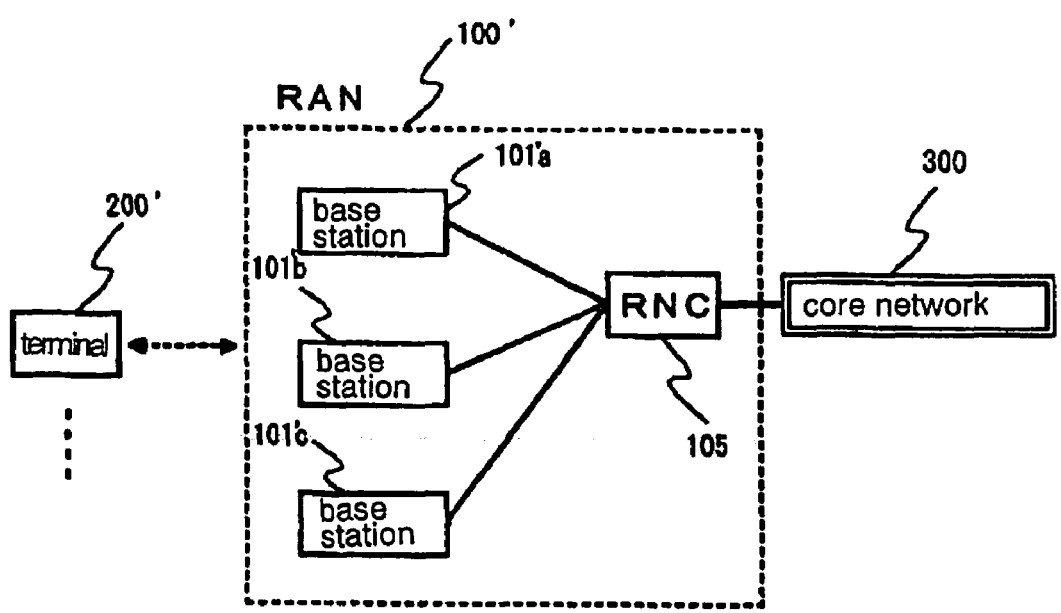
FIG. 1 is a block diagram illustrating an exemplary configuration of a mobile communication system.
Figure 2:
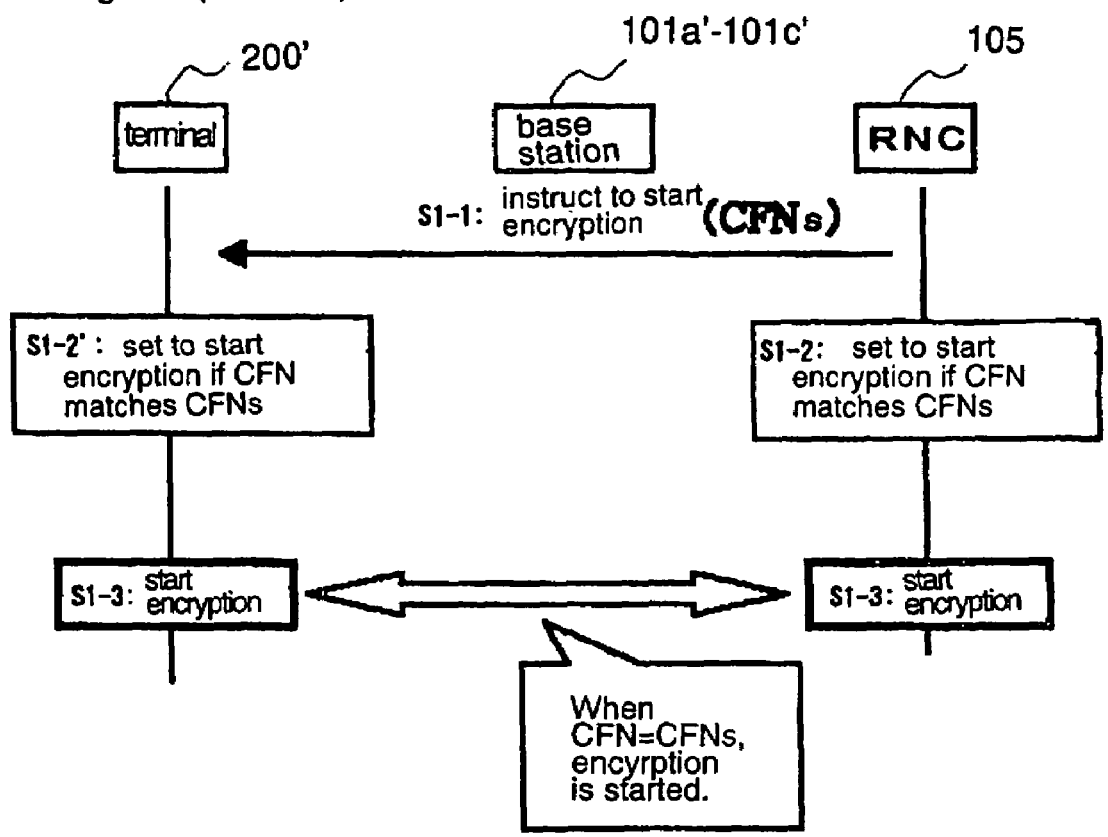
FIG. 2 is a sequence diagram illustrating a conventional encryption procedure.
Figure 3:
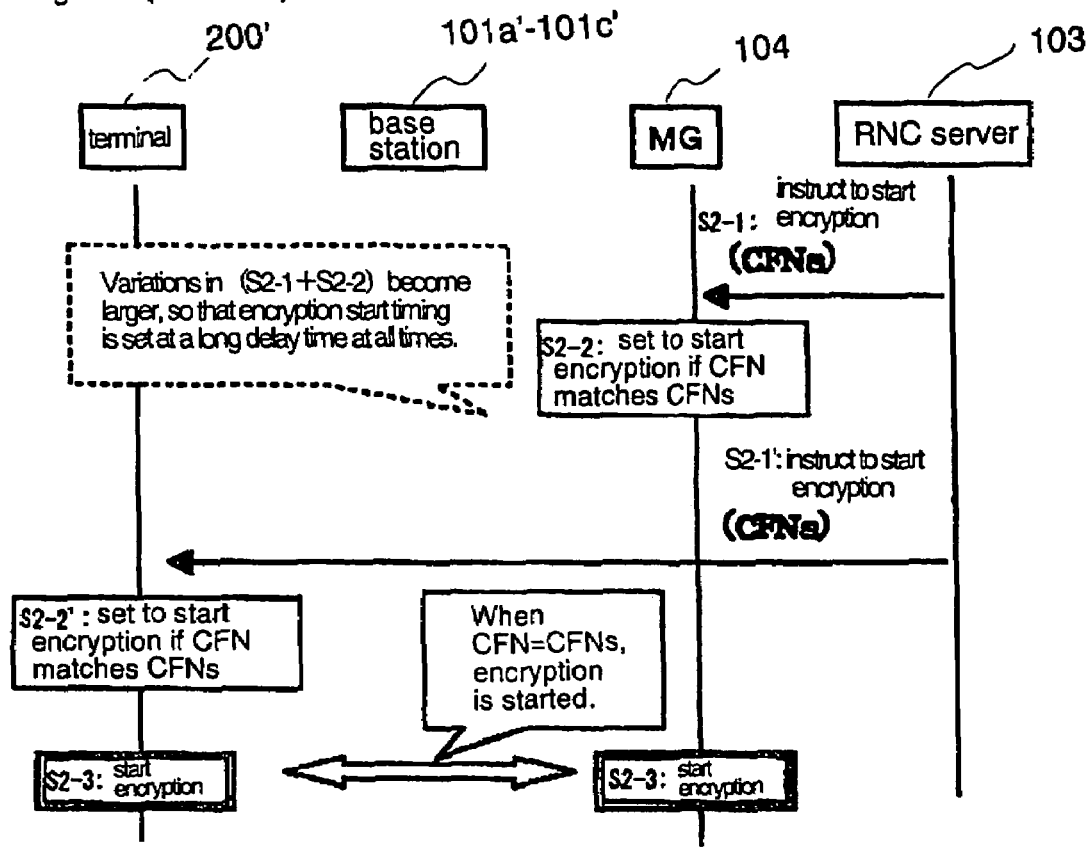
FIG. 3 is a sequence diagram illustrating a conventional encryption starting procedure in a C/U separated mobile communication access network.
Figure 4:
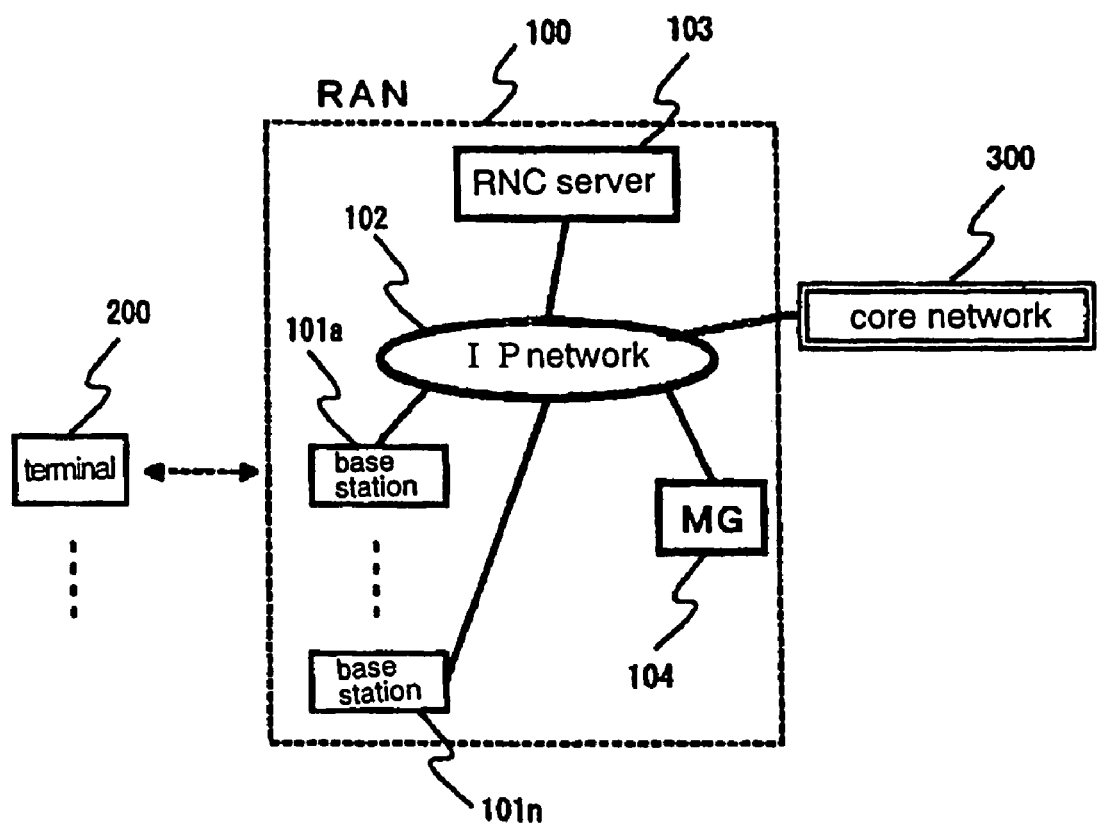
FIG. 4 is a block diagram illustrating an exemplary C/U separated mobile communication system to which a cryptographic communication method is applied in accordance with the present invention.

FIG. 4 is a block diagram illustrating an exemplary C/U separated mobile communication system to which a cryptographic communication method is applied in accordance with the present invention. In this system, the radio network controller (RNC) shown in FIG. 1 is divided into RNC server 103 associated with the C-Plane and media gateway (MG) 104 associated with the U-Plane. Radio access network (RAN) 100 comprises a plurality of base stations 101a-101n, RNC server 103, and MG 104 which are interconnected through IP network 102, with IP network 102 being further connected to core network 300.

FIG. 5 is a sequence diagram illustrating a cryptographic communication method according to a first embodiment of the present invention. Note, however, that a synchronization establishment procedure is omitted for simplification.

In the cryptographic communication method according to the first embodiment, a predetermined secret key has been previously shared between MG 104 and terminal 200, followed by the execution of encryption start processing in accordance with the following procedure.

Step S3-1: RNC server 103 instructs MG 104 to start the encryption.

Step S3-2: Upon receipt of the encryption start instruction from RNC server 103, MG 104 uses the secrete key previously shared with terminal 200 to encrypt U-Plane information to be transmitted to terminal 200, and changes an encryption start bit, added to the U-Plane information, from "0" to "1." The encryption start bit set at "1" means the encryption start instruction.

Step S3-3: MG 104 adds the encryption start bit set at "1" to the encrypted U-Plane information, and transmits the resulting information to terminal 200.

Terminal 200 checks the encryption start bit included in the received signal, and decrypts the U-Plane information received from MG 104 using the secret key previously shared with MG 104.

Step S3-1': RNC server 103 instructs terminal 200 to start the encryption.

Step S3-2': Upon receipt of the encryption start instruction from RNC server 103, terminal 200 uses the secrete key previously shared with MG 104 to encrypt U-Plane information to be transmitted to MG 104, and changes the encryption start bit added to the U-Plane information from "0" to "1."

Step S3-3': Terminal 200 adds the encryption start bit set at "1" to the encrypted U-Plane information, and transmits the resulting information to MG 104.

MG 104 checks the encryption start bit included in the received signal, and decrypts the U-Plane information received from terminal 200 using the secret key previously shared with terminal 200 if the encryption start bit has been changed from "0" to "1."

A similar procedure may be used to change the secret key which is shared between MG 104 and terminal 200.

FIG. 6 is a sequence diagram illustrating a cryptographic communication method according to a second embodiment of the present invention. Note, however, that a synchronization establishment procedure is omitted for simplification. In the cryptographic communication method according to the second embodiment, a change to another secret key is made through the following procedure when a cryptographic communication is in progress using a predetermined secret key between MG 104 and terminal 200.

Step S4-1: RNC server 103 instructs MG 104 to update the secret key.

Step S4-2: Upon receipt of the secret key update instruction from RNC server 103, MG 104 encrypts U-Plane information to be transmitted to terminal 200 using another secret key previously shared with terminal 200, and changes the secret key update bit added to the U-Plane information from "0" to "1." The secret key update bit set at "1" means the secret key update instruction.

Step S4-3: MG 104 adds the secret key update bit set at "1" to the encrypted U-Plane information, and transmits the resulting information to terminal 200.

Terminal 200 checks the secret key update bit included in the received signal, and decrypts the U-Plane information received from MG 104 using the other secret key if the secret key update bit has been changed from "0" to "1".

Step S4-1': RNC server 103 instructs terminal 200 to updatethe secret key.

Step S4-2': Upon receipt of the secret key update instruction from RNC server 103, terminal 200 encrypts the U-Plane information to be transmitted to MG 104 using the other secret key, and changes the secret key update bit added to the U-Plane information from "0" to "1."

Step S4-3': Terminal 200 adds the secret key update bit set at "1" to the encrypted U-Plane information, and transmits the resulting information to MG 104.

MG 104 checks the secret key update bit included in the received signal, and decrypts the U-Plane information received from terminal 200 using the other secret key if the secret key update bit has been changed from "0" to "1".

In the foregoing embodiments, the encryption is started or a secret key is updated by changing the value of the predetermined "encryption start bit" or "secret key update bit" included in the U-Plane information upon start of encryption or upon update of the secret key. The present invention, however, is not limited to this particular manner of operation. Alternatively, an equivalent message may be multiplexed on the U-Plane information in a different form to provide the same benefit.

Also, while the RNC server instructs both the MG and terminal to start encryption and update a secret key, the RNC server may instruct either the MG or terminal to start encryption or update the secret key in another procedure. This is because a party which has received the encryption start bit or secret key update bit can know from these bits that the encryption will be started or that the secret key will be updated.

Further, encryption control information comprised of the encryption start bit and a secret key update bit may be added to encrypted U-Plane information to control the start of encryption and a change of the secret key as illustrated in FIGS. 5 and 6, respectively.

What is claimed is:

1. A cryptographic communication method for use in a communication network having a plurality of terminal devices, a communication controller associated with a control plane (hereinafter called a "C-Plane"), and a data communication device associated with a user plane (hereinafter called a "U-plane"), in such a manner that said communication controller is separated from said data communication device, wherein at least one secret key is shared between an arbitrary terminal and said data communication unit, said method comprising the steps of:

transmitting encryption control information to at least one of said data communication device and said terminal by said communication controller;

encrypting U-Plane information to be transmitted to the other party using one of the shared secret keys in accordance with contents of the encryption control information upon receipt of the encryption control information, and adding the encryption control information to the encrypted U-Plane information for transmission to the other party by one of said data communication device and said terminal; and decrypting the encrypted U-Plane information using one of the shared secret keys by said other party upon receipt of the encrypted U-Plane information with the encryption control information added thereto.

2. A cryptographic communication method for use in a communication network having a plurality of terminal devices, a communication controller associated with a control plane (hereinafter called a "C-Plane"), and a data communication device associated with a user plane (hereinafter called a "U-plane"), in such a manner that said communication controller is separated from said data communication device, wherein a secret key is shared between an arbitrary terminal and said data communication unit, said method comprising the steps of:

transmitting an encryption start instruction to at least one of said data communication device and said terminal by said communication controller;

encrypting U-Plane information to be transmitted to the other party using the secret key upon receipt of the encryption start instruction, and adding the encryption start information to the encrypted U-Plane information for transmission to the other party by one of said data communication device and said terminal; and decrypting the encrypted U-Plane information using the shared secret key by said other party upon receipt of the encrypted U-Plane information with the encryption starts information added thereto.

3. A cryptographic communication method for use in a communication network having a plurality of terminal devices, a communication controller associated with a control plane (hereinafter called a "C-Plane"), and a data communication device associated with a user plane (hereinafter called a "U-plane"), in such a manner that said communication controller is separated from said data communication device, wherein another secret key different from a secret key currently in use is shared between an arbitrary terminal and said data communication unit, said method comprising the steps of:

transmitting a secret key update instruction to at least one of said data communication device and said terminal by said communication controller;

encrypting U-Plane information to be transmitted to the other party using the other secret key upon receipt of the secret key update instruction, and adding secret key update information to the encrypted U-Plane information for transmission to the other party by one of said data communication device and said terminal; and decoding the encrypted U-Plane information using the other secret key by said other party upon receipt of the encrypted U-Plane information with the secret key update information added hereto.

4. The cryptographic communication method according to claim 2, wherein said other party which has received the encrypted U-Plane information with the encryption start information added thereto decrypts the encrypted U-Plane information using the secret key when said other party receives the encryption start instruction.

5. The cryptographic communication method according to claim 3, wherein said other party which has received the encrypted U-Plane information with the secret key update information added thereto decrypts the encrypted U-Plane information using the other secret key when said other party receives the secret key update instruction.

6. The cryptographic communication method according to claim 2, wherein said communication network is a mobile communication network, said communication controller is a radio network control (RNC) server, and said data communication device is a media gateway (MG).

7. The cryptographic communication method according to claim 3, wherein said communication network is a mobile communication network, said communication controller is a radio network control (RNC) server, and said data communication device is a media gateway (MG).

* * * * *